(No Model.)
J. PRESTON.
Adjustable Piston.
No. 242,366.  Patented May 31, 1881.
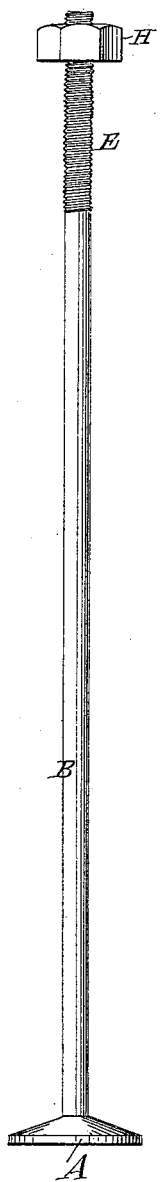
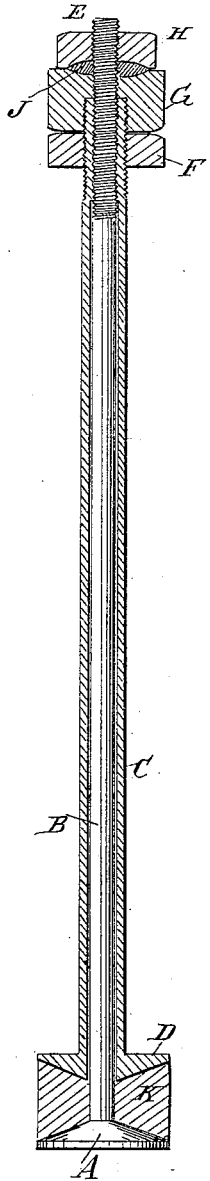
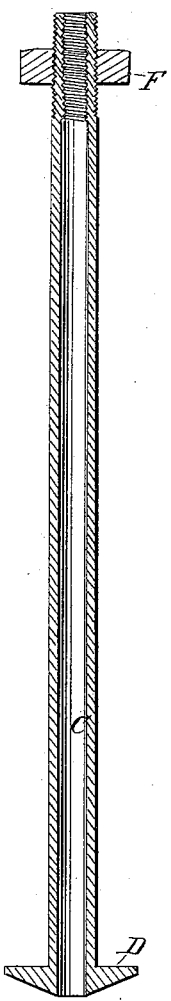
WITNESSES:
INVENTOR:
James Preston
BY
ATTORNEYS.

United States Patent Office.

JAMES PRESTON, OF NEW YORK, N. Y., ASSIGNOR OF ONE-HALF TO SAMUEL A. BURNS AND CHARLES A. COOK, OF SAME PLACE.

ADJUSTABLE PISTON.

SPECIFICATION forming part of Letters Patent No. 242,366, dated May 31, 1881.

Application filed October 22, 1880. (No model.)

*To all whom it may concern:*

Be it known that I, JAMES PRESTON, of the city, county, and State of New York, have invented a new and Improved Adjustable Piston, of which the following is a specification.

The object of my invention is to provide a new and improved adjustable piston, which is so constructed that the packing of the same can be depressed and spread proportionately as it wears off, by adjusting the piston accordingly, so that the packing will always fit closely in the pump-cylinder. A packing of any desired size is held between the opposite convex or flat conical surfaces of the plates, and in case this packing becomes worn off it can be spread by forcing the disks toward each other.

In the accompanying drawings, Figure 1 is a side elevation of my improved piston. Fig. 2 is a side elevation of the piston-rod having the convex plate attached to its lower end, with the sleeve, nuts, and median packing-disk in section. Fig. 3 is a longitudinal sectional elevation of the sleeve that is passed over the piston-rod.

A flat conical or convex disk, A, is attached to the lower end of a piston-rod, B, in such a manner that this rod passes into the apex of the disk. A sleeve, C, fits closely over the rod B, and has a like flat conical convex disk, D, attached to its lower end; but in this case the sleeve is not attached to the convex surface of the disk, but to the rear of the same, so that the two conical convex surfaces face each other. A packing, K, of any desired material, is placed between the two opposite convex surfaces of the disks A and D.

The rod B is provided with a screw-thread, E, at the upper end, and the sleeve C is provided with an internal thread at the upper end, which thread takes in that of the rod B; consequently the sleeve C can be adjusted longitudinally by rotating the sleeve in either direction.

The upper end of the sleeve C is also provided with an external thread, for the purpose of screwing a nut or collar, F, upon the end of this sleeve.

The rod B having been passed through the sleeve C, a nut, G, is screwed upon the end of the sleeve and of the rod, as shown, and then the sleeve and this nut are adjusted as the packing may require—that is, until the packing is held tightly between the two disks. The sleeve having been adjusted, it is locked in the desired position by means of the locking-nut H.

The upper part of the nut G is recessed, as the under side of the nut H is also, and a packing, J, is placed into the recess formed between the two adjoining nuts G and H. This packing J serves to prevent the escape of steam, &c., through the space between the rod B and the sleeve C.

The inside screw of the sleeve C may be dispensed with, if desired, and the adjustment accomplished by means of the locking-nut H only.

By forcing the disks A and D toward each other the packing is compressed between them and spread outward.

This improved piston is to be used in pumps, engines, blowers, &c.

The piston can be adjusted without removing it from the cylinder by holding the rod B firmly and rotating the sleeve C.

Having thus described my invention, I claim as new and desire to secure by Letters Patent—

1. The combination of the upwardly-convexed disk on rod B, the downwardly-convexed disk on sleeve C, and an intermediate packing-disk, K, concaved on its opposite sides, all constructed and arranged as shown and described.

2. In a piston, the combination, with the rod B and sleeve C, of the nut G, having a recess in the upper surface of the locking-nut H, having a recess in the lower surface, and of the packing J, held between the two adjoining surfaces of these nuts, substantially as herein shown and described, and for the purpose set forth.

JAMES PRESTON.

Witnesses:
OSCAR F. GUNZ,
C. SEDGWICK.